(12) United States Patent
Dennard et al.

(10) Patent No.: US 9,247,011 B2
(45) Date of Patent: Jan. 26, 2016

(54) SYSTEM AND METHOD FOR REDUCING LATENCY OF LOCATION BASED INFORMATION RETRIEVED FROM A LOCATION SERVICE

(71) Applicant: INTERNATIONAL BUSINESS MACHINES CORPORATION, Armonk, NY (US)

(72) Inventors: Mark D. Dennard, Decatur, GA (US); Lasith G. Perera, Lake Oswego, OR (US); Sri Ramanathan, Lutz, FL (US); William P. Shaouy, Atlanta, GA (US); Matthew A. Terry, Celebration, FL (US); Matthew B. Trevathan, Roswell, GA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/309,957

(22) Filed: Jun. 20, 2014

(65) Prior Publication Data

US 2014/0304330 A1 Oct. 9, 2014

Related U.S. Application Data

(62) Division of application No. 12/233,947, filed on Sep. 19, 2008, now Pat. No. 8,774,826.

(51) Int. Cl.
*H04W 24/00* (2009.01)
*H04L 29/08* (2006.01)
*H04W 4/02* (2009.01)
*H04L 1/00* (2006.01)

(52) U.S. Cl.
CPC .............. *H04L 67/18* (2013.01); *H04L 1/0018* (2013.01); *H04L 67/306* (2013.01); *H04W 4/02* (2013.01)

(58) Field of Classification Search
CPC ..... H04L 67/18; H04L 67/306; H04L 1/0018; H04W 4/02
USPC .......... 455/456.1, 456.3, 414.2, 456.5, 435.1, 455/452.2
See application file for complete search history.

(56) References Cited

U.S. PATENT DOCUMENTS

| 6,332,163 | B1 | 12/2001 | Bowman-Amuah |
| 7,142,876 | B2 | 11/2006 | Trossen et al. |
| 2005/0043037 | A1* | 2/2005 | Ioppe ............... H04W 4/02 455/456.1 |
| 2005/0250516 | A1 | 11/2005 | Shim |
| 2008/0062940 | A1 | 3/2008 | Othmer et al. |
| 2008/0119160 | A1 | 5/2008 | Andriantsiferana et al. |
| 2008/0176582 | A1* | 7/2008 | Ghai ................. H04L 45/38 455/456.2 |

(Continued)

OTHER PUBLICATIONS

Ian F. Akyildiz et al., "The Predictive User Mobility Profile Framework for Wireless Mulitmedia Networks", IEEE/ACM Transactions on Networking, vol. 12, No. 6, Dec. 2004, pp. 1021-1035.

(Continued)

*Primary Examiner* — Khai M Nguyen
(74) *Attorney, Agent, or Firm* — Matthew Chung; Roberts Mlotkowski Safran & Cole, P.C.

(57) ABSTRACT

A system and method is provided for reducing latency when providing user location information services. The system is implemented in a computer infrastructure which includes computer executable code tangibly embodied on a computer readable medium. The executable code is operable to trigger a location based service to obtain user location information prior to the user registering for location services.

19 Claims, 4 Drawing Sheets (56) References Cited

U.S. PATENT DOCUMENTS

2009/0098921 A1* 4/2009 Manning ............ G06Q 20/3224
463/17
2012/0167195 A1 6/2012 McQuaide, Jr.

OTHER PUBLICATIONS

Luminita Moraru et al., "Near Optimal Geographic Routing with Obstacle Avoidance in Wireless Sensor Networks by Fast-Converging Trust-Based Algorithms", Q2SWinet '07, Oct. 22, 2007, Chania, Crete Island, Greece., pp. 31-38.

Thomas F. La Porta et al., "Experiences with network-based user agents for mobile applications", Mobile Networks and Applications 3, 1998, pp. 123-141.

Joseph S. M. Ho et al., "Dynamic Hierarchical Database Architecture for Location Management in PCS Networks", IEEE/ACM Transactions on Networking, vol. 5, No. 5, Oct. 1997, pp. 646-660.

\* cited by examiner

SYSTEM AND METHOD FOR REDUCING LATENCY OF LOCATION BASED INFORMATION RETRIEVED FROM A LOCATION SERVICE

FIELD OF THE INVENTION

The invention generally relates to a system and method of reducing latency in a location based system and, more particularly, to a system and method for implementing a presence driven location platform implementation to increase throughput and reduce latency while supporting subscriber QoS.

BACKGROUND

Faced with an increasingly difficult challenge in growing both average revenue per user (ARPU) and numbers of subscribers, wireless carriers are trying to develop a host of new products, services, and business models based on data services. One such service is location services, which provides information specific to a location including actual locations of a user. It is expected that location based services will generate additional business for the carrier, from both the mobile user and content providers.

For the mobile user as well as the service provider, location-based services offer many opportunities. For example, location-based services can increase revenue of the service provider, e.g., network carrier, while improving services to end users, e.g., mobile users. Some examples of location-based services that can be provided to the mobile user include:

Providing the nearest business or service, such as an ATM or restaurant;
Providing alerts, such as notification of a sale on gas or warning of a traffic jam; and
Providing weather reports which are germane to the location where the user is using the mobile device, etc.

For the network carrier, location-based services provide value add by enabling services such as:

Resource tracking with dynamic distribution (e.g., Taxis, service people, rental equipment, doctors, fleet scheduling, etc.);
Finding people or information for the user (e.g., Person by skill (doctor), business directory, navigation, weather, traffic, room schedules, stolen phone, emergency 911);
Proximity-based notification (push or pull) (e.g., Targeted advertising, buddy list, common profile matching (dating), automatic airport check-in); and
Proximity-based actuation (push or pull) (e.g., Payment based upon proximity (EZ pass, toll watch).

In addition, location based services (LBS) are convenient for sharing location data between wireless devices to wireless devices and from wireless devices to stationary devices like a home computer or stationary tracking system or content provider, etc. This would allow a third party to determine an exact location of a mobile user such as, for example, a family member, friend, employee, etc.

Two methods are commonly in use to determine the location of a wireless device with a third method starting to become more popular. These methods include signal strength of cell towers that are near the wireless device (e.g., triangulation); GPS triangulation; and exposing the LBS as a web service.

The first method determines a wireless device's location by comparing the signal strength of cell towers that are near the wireless device. This method is called triangulation and is substantially the same method that GPS devices use to determine their location. The difference between cell triangulation and GPS triangulation, though, is the signals they use to determine location. The second method, GPS triangulation, uses satellites to determine a device location. In either case, the latitude and longitude are kept in the location services infrastructure.

Another method includes creating location based services by exposing the LBS as a web service. For example, when a device wants an update from the location-based system, it sends a request with the proper authentication credentials and a unique identifier that describes the device that is being tracked. The LBS returns the coordinates of the device being queried.

To date, though, there are a number of reasons that telecommunication networks have not embraced location-based services. These reasons include, for example, the fact that the latencies associated with precision location determination are high (sometimes several thousand milliseconds) and network carriers have consistently wanted to control all services on the device platforms in play, preventing third party location based services to use device processing power and capabilities. Additionally, from a network perspective, location determination is an expensive operation that consumes significant network resources.

Latency is due mainly to the current call flow which involves several steps. For example, to request location information, the mobile first connects to the network, e.g., location service provider, which, in turn, connects to the location platform. The user then requests location information from the location platform. To obtain the location information, the location platform queries mobile positioning equipment which sends a position response back to the location platform. The location platform then provides this location information to the service provider, which then sends it back to the mobile user. This flow, however, results in a significant delay which impacts services and revenue. Specifically the following components are impacted:

Latency, possibly resulting in suboptimal end user experience;
Throughput issues, which limit the amount of traffic that can flow through the location and MPE (Mobile Positioning Equipment) and LP (Location Platform) infrastructure; and
Quality of Service as a whole, which impacts the relative service characteristics delivered to the end subscriber as a part of standard revenue call flows.

SUMMARY

In an aspect of the invention, a system is implemented in a computer infrastructure which comprises computer executable code tangibly embodied on a computer readable medium. The code is operable to trigger a location based service to obtain user location information prior to the user registering for location services.

In another aspect of the invention, a system comprises: first program instructions to register a user with a network or service provider; second program instructions to trigger a location platform to obtain user location information prior to a user request; third program instructions to cache the user location information; a computer readable media which stores the first, second and third program instructions; and a central processing unit to execute the first, second and third program instructions.

In another aspect of the invention, a method provides location information. The method is provided on a computer infrastructure. The method comprises: receiving a network log on request or authentication; requesting location information of a user upon receipt of the network log on request or authentication; storing the location information in a cache; receiving a request for location based services from the user; and retrieving the location information from the cache and using the location information to deliver composite services, of which the location information is a component.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention generally relates to a system and method of reducing latency in a location based system and, more particularly, to a system and method for implementing a presence driven location platform implementation to increase throughput and reduce latency while supporting subscriber QoS. In implementation, the present invention establishes a connection to the location platform upon a triggering event, e.g., logging onto a network at start-up. The triggering event will trigger the location platform to obtain location information of the user. This will improve the efficiencies of location platforms from a QoS, latency and throughput perspective, in both IMS and non IMS networks, as the location of the mobile user can be predetermined, prior to the user actually requesting location services.

More specifically, the present invention reduces latencies, increases throughput and improves overall subscriber delivered QoS by optimizing the origination points and delivery mechanism of location information in a commercial wireless telecommunications network. This is accomplished by pre-determining location based on network triggers in the SS7 and non-SS7 (data) network operating environments to drive location determination procedures and subsequent storage of this information; as opposed to the current largely service request initiated determination approach, which is highly prone to latency and throughput issues.

Advantages of the present invention include, for example,
the ability to significantly improve location platform throughput by allowing more traditional location dips to be processed per unit time and therefore getting more usage out of the existing infrastructure and capacity model;
the ability to reduce the latency experienced by subscribers, by using values for coarse location services that are already in the system;
the ability to support a more uniform QoS model, instead of the current one where 10000 millisecond values are the norm; and
the ability to accommodate both IMS and non-IMS networks by using a diameter based implementation for IMS networks.

In embodiments, the present invention is based on an opt in service using, for example, profile information. More specifically, using a profile based approach ensures that the service of the present invention does not occur for every subscriber; but instead only for those subscribers who have opted into the service. This approach ensures that the location platform is not unduly flooded, and that the service provider is adequately compensated by the users for providing such services.

The present invention also takes into account other considerations, which can be implemented with the present invention as discussed herein. For example, the present invention is configured to transition to IMS (IP multimedia Subsystem) based reference architectures that require the core network to standardize on an IP based backplane wherein session is properly shared amongst multiple underlying media types, providing a practical means to deliver composite services, of which location is a component. The present invention also takes into account the fact that mobile broad band networks are increasingly poised to serve as fixed broad band networks, such as those based on the recently ratified 802.16e (Wimax) standard, meaning that location is now more dependent on data service based origination as opposed to being reliant on SS7 based services. The present invention also provides for both coarse and fine grain dip (cell sector dip) location services, depending on the implementation of the invention. The present invention is especially well adapted for coarse grain dip location services such as, for example, a location based weather service, a location based news service and a location based restaurant or other service or goods establishment that does not need precise coordinates.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:
an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 1:
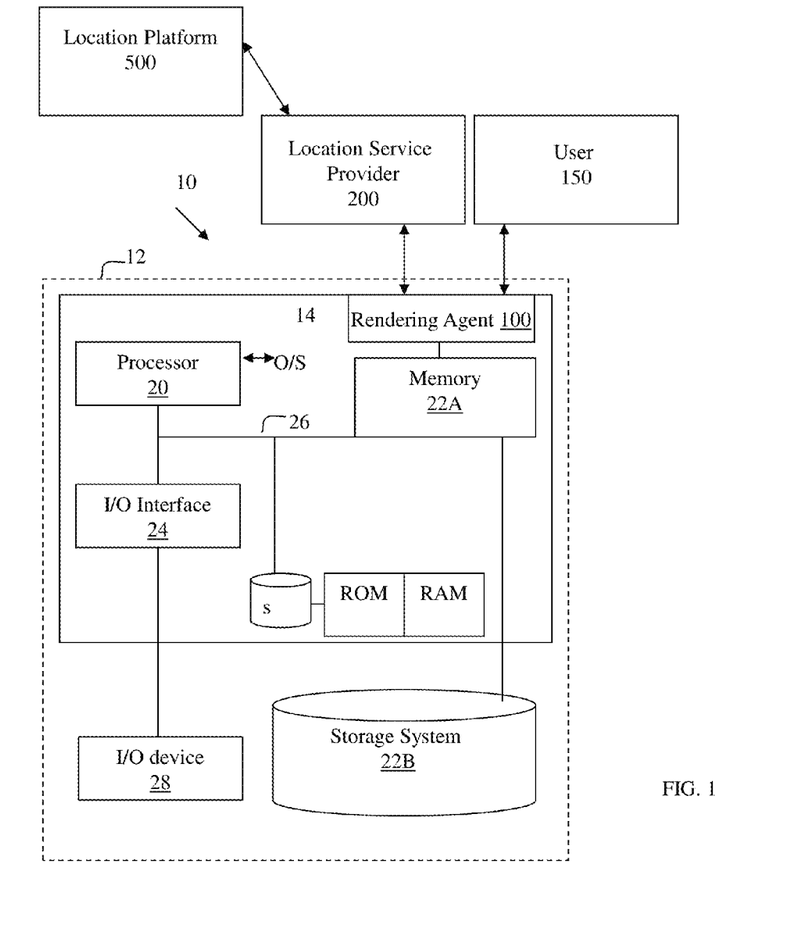
FIG. 1 an illustrative environment for implementing the steps in accordance with the invention.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

Figure 3:
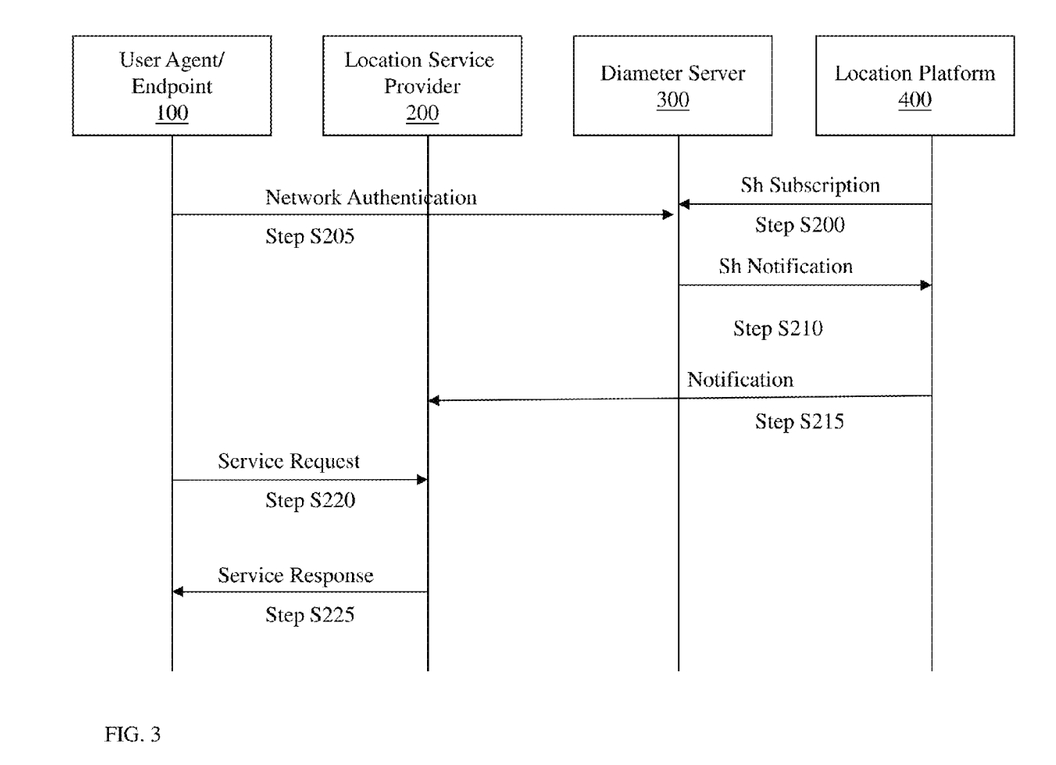
FIG. 3 is a swim lane diagram implementing exemplary processes in accordance with aspects of the invention.

The computing device 14 includes a Rendering Agent (module or program code) 100 configured to make the computing device 14 operable to perform the services described herein. The Rendering Agent 100 can be implemented as one or more program code stored in memory 22A as separate or combined modules. As discussed below, the computing system 12 can include a Location Service Provider 200 and Location Platform 400. Alternatively, the Location Service Provider 200 and the Location Platform 400 can be provided on their own infrastructure, similar to that shown in FIG. 1 and as should be known to those of skill in the art.

In embodiments, in a legacy system, the Rendering Agent 100 may be a home location register (HLR). In a non-legacy system, the Rendering Agent 100 can be a Location Service Provider 200 using a Diameter based protocol (Sh message), to communicate with a Diameter Server (shown in FIG. 3) which, in turn, communicates with the Location Platform 400. Also, the present invention is configured to transition to IMS (IP multimedia Subsystem) based reference architectures that require the core network to standardize on an IP based backplane, as discussed above, as well as mobile broad band networks e.g., 802.16e (Wimax) standard.

In an illustrative example of operation, immediately upon the user 150 logging onto the network, the Rendering Agent 100 will obtain location information from the Location Service Provider 200 and/or Location Platform 400 depending on the network architecture. This can be accomplished by providing a triggering notification to the Location Platform 400, for example, immediately upon the user registering (e.g., logging onto) with the network, and prior to actually requesting location information from the Location Service Provider 200 and/or the Location Platform 400.

More specifically, in the above example, once the network connection is established with the user, location information of the mobile user can be obtained from the Location Platform 400 and stored (cached) in a storage unit 22B, for later retrieval. The location information can be stored at the Location Platform 400 or the Location Service Provider 200. The location information also can be updated periodically, without the user actually requesting such information to provide a finer grain location dip. Upon a request for location information, the stored location information can be used to retrieve content or other services, including the location information, itself, without any latency. In this way, the present invention can improve the efficiencies of location platforms from an QoS, latency and throughput perspective, in both IMS and non IMS networks, as the location of the mobile user can be predetermined, prior to an initial request for location services.

Depending when the user 150 requests location information, the location information can be retrieved from the storage unit 22B as either coarse or fine grained location information. For example, course grained location information can be provided to the user 150 if the location information was obtained at the time of the triggering event, e.g., logging into the network. On the other hand, if the location information is periodically updated, say, for example, every 10 minutes, the user 150 can obtain more updated location information, upon a request for location information. In this latter scenario, the user 150 would be provided with finer grained location information.

In further embodiments, the Rendering Agent 100 allows for more location dips to be processed per unit time and therefore obtain more usage out of the existing infrastructure and capacity model by providing an initial dip at a triggering notification and at predetermined intervals. More specifically, to obtain finer grain location information, the present invention provides a low priority refresh of cache in the background to maintain the quality of the location data that pertains to a subscriber. In this regard, the priority/frequency associated with the refresh can be altered based on the nature of the service. Also, as the dip (request for location) is provided at network log in or at a time prior to any request for location information (and not at registration or service request from the location service provider or location platform), the Rendering Agent 100 (and more specifically the system of the present invention) reduces the latency previously experienced by the users in conventional systems.

In embodiments, the user 150 can register with the Rendering Agent 100 for the services discussed herein. In this way, the Rendering Agent 100 can provide a profile for the user 150 which ensures that the services of the present invention do not occur for every subscriber but instead only for those subscribers who have opted into the service. The profile can be stored in the storage unit 22B.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, the handheld device, PDA, handset, etc. In particular, the I/O device 28 may be used to display a visual representation (service) in accordance with the invention such as, for example, icon based click on lists or other visual services.

In general, the processor 20 executes computer program code, which can be stored in the memory 22A and/or storage system 22B. While executing the computer program code, the processor 20 can read and/or write data to/from memory 22A, storage system 22B, and/or I/O interface 24. The program code executes the processes of the invention. The storage system 22B may be an HSS database. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. These customers may be, for example, a mobile user or a third party requesting content, or information about another user. In return, the service provider can receive payment from the customer(s) under a subscription and/or fee agreement and/or the service provider can receive payment from the sale of advertising content to one or more third parties.

Exemplary Processes and System Architecture

Figure 2:
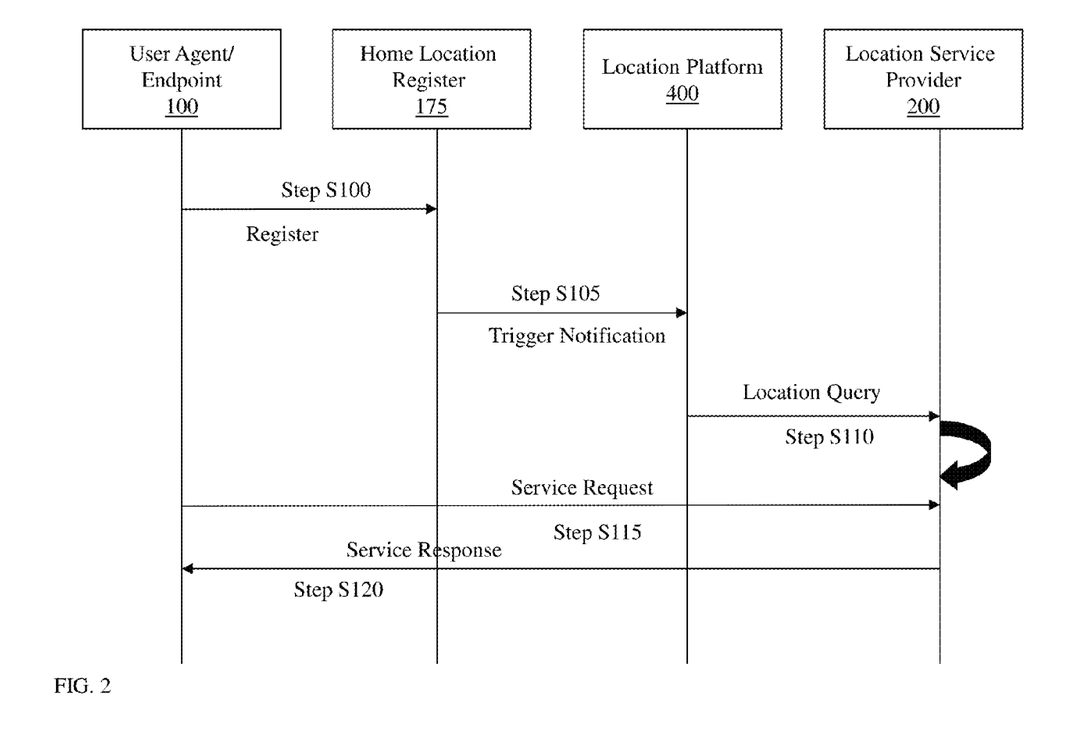
FIG. 2 is a swim lane diagram implementing exemplary processes in accordance with aspects of the invention.

FIGS. 2 and 3 illustrate exemplary processes in accordance with the present invention. The steps of FIGS. 2 and 3 may be implemented on the computer infrastructure of FIG. 1, for example. The swim lane diagram in FIGS. 2 and 3 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flowchart, and combinations of the flowchart illustrations can be implemented by special purpose hardware-based systems that perform the specified functions or acts, or combinations of special purpose hardware and computer instructions and/or software, as described above.

More specifically, FIG. 2 shows a swim lane diagram using a legacy system implementing exemplary processes in accordance with aspects of the invention. That is, FIG. 2 depicts the flow in a home location register (HLR) based environment, where the HLR almost immediately realizes when the device is on the network.

The swim lane diagram of FIG. 2 shows four "players": the user agent 150, the home location register 175, the location platform 400 and the location service provider 200. The user agent may be any user device such as, for example, a PDA, a cellular telephone or other portable computing device. In embodiments, the user agent 150 can also be depicted as the I/O device 28 of FIG. 1.

The home location register 175 is the main database of permanent subscriber information for a mobile network. More specifically, the home location register 175 contains user information, including address, account status, and preferences. As such, the home location register 175 is configured to set up the legacy voice network, upon registration by the user agent 150.

The location platform 400 is a platform which is configured to determine a location of the user. The location platform 400 can provide location information using known methods. The location information can be provided to the location service provider 200 which, in turn, provides this information to the end user 150.

At step S100, the user 150 registers with the home location register. That is, the user (e.g., handset) logs onto the home location register, which sets off a trigger at the home location register. At step S105, the trigger is sent to the location platform. At step S110, the location platform then initiates a location query of the user at the location service provider (or internally at the location platform). It should be understood that the location service provider may be the network carrier that maintains the location platform or a content provider, for example. This results in the user (e.g., mobile device) location being obtained, prior to the registration by the user with the location service provider or location platform. The location service provider makes a query to the location platform using existing API's such as, for example, Open LS or Parlay X.

The location platform optionally stores the location information or notifies the actual service provider which then stores the information for subsequent use to deliver services. The location information can be stored in, e.g., storage unit 22B of FIG. 1. The location information can be periodically updated by the location platform or location service provider and stored in a storage unit, e.g., storage unit 22B of FIG. 1, prior to any requests by the user.

At step S115, the user requests (registers) location information from the location service provider. At step S120, the location service provider can immediately respond to the user with the location information that is stored (cached) in the storage unit. In embodiments, the service provider can respond to the user's request by formulating a composite service, e.g., a weather lookup, and then respond back to the user with the requested content and/or location information. This will greatly reduce latency issues as the location information is already known prior to the user requesting such location information.

FIG. 3 shows a swim lane diagram implemented in an IMS environment showing exemplary processes in accordance with aspects of the invention. The swim lane diagram of FIG. 3 shows four "players": the user agent 150, the location service provider 200, a diameter server 300 and a location platform 400. This embodiment is related to an IMS service related platform.

At step S200, the location platform uses a Diameter (Sh) based subscription to the diameter server to support notification. At step S205, a user registers on the data network; that is, the user sends a diameter request for network authentication and authorization. At step S210, the diameter server requests user location information from the location platform. The request is provided by a Sh based notification. As in the previous embodiment, this request for location information is provided proactively, i.e., prior to the user requesting location based information. The location information can be updated periodically on a predetermined basis to provide a finer grain dip.

At step S215, the location platform notifies the location service provider of the location information. The location information may be stored (cached) either at the location service provider or the location platform. In other words, the location platform can notify the location service platform of the location which then persists the data for subsequent use in driving subscriber services load.

At step S220, the user requests a service from the location service provider, e.g., content or service based on location. At step S225, the location service provider immediately provides content to or other location based services to the user based on the stored location information. As in the previous embodiments, by having the location information stored locally (prior to a location based request), the location information can be provided immediately to the user thus eliminating any latencies in the system. Standard subscriber initiated interaction with existing position data can now be utilized, allowing for significant throughput, latency and QoS improvements.

Figure 4:
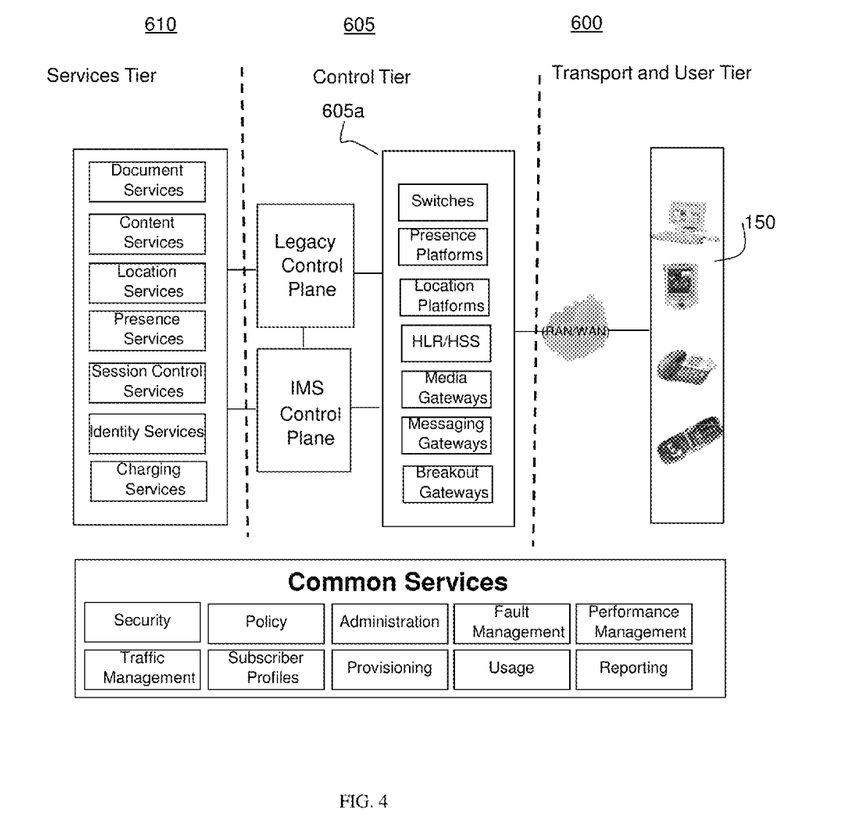
FIG. 4 shows an overview of the architecture in accordance with aspects of the invention

FIG. 4 shows an overview of the architecture in accordance with aspects of the invention. In particular, the architecture is shown in three tiers: transport and user tier 600, a control tier 605 and a services tier 610. The user tier 600 includes the users 150 which are represented as different types of devices capable of communicating with the control tier 605 (legacy and IMS control planes. The control tier 605 includes a set of network services 605a. The network services 605a can include, amongst other services and functions, switches, presence and location platforms (including, e.g., the location platform 400), HLR (including, e.g., the home serve register 175) and HSS (home subscriber service), as well as media, messaging and breakout gateways. Common services may be, for example, security, policy, administration, fault management, performance management, traffic management, subscriber profiles, provisioning, usage and reporting, to name several non-limiting examples.

The control tier 605 also includes the legacy control plane (e.g., SS7) and an IMS control plane (non-legacy). The IMS control plane can include, for example, the recently ratified 802.16e (Wimax) standard. The legacy control plane (e.g., SS7) and an IMS control plane (non-legacy) communicate with the services tier 610, for obtaining services for the users 150. The services tier 610 includes different services such as, for example, document services, content services, location services, presence services, session control services, identify services, and charging services, to name a few. The IMS control plane can communicate using the Diameter protocol, for example.

By using the architecture and method of the present invention, it is possible to significantly improve location platform throughput by allowing more traditional location dips to be processed per unit time and therefore obtain more usage out of the existing infrastructure and capacity model. The latency commonly experienced by users can also be eliminated by obtaining location information prior to a request for content or other services, and storing such information for retrieval upon request. This also allows the location platform to support a more uniform QoS model. Also, to obtain finer grain location information, the present invention can provide a low priority refresh of the cache in the background to maintain the quality of the location data that pertains to a subscriber. In this regard, it is contemplated to alter the priority/frequency associated with the refresh based on the nature of the service that the location data has been obtained for (some services may require more precise location data driven by the fact that the older the location information is, the lower the probability that it is still valid, given the nature of mobile subscribers).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A system, comprising:
   one or more computer processors;
   a computer readable hardware storage device;

program instructions stored on the computer readable hardware storage device for execution by the one or more computer processors, the program instructions comprising:

first program instructions to register a user with a network or service provider;

second program instructions to trigger a location platform when the user is logging onto the network or the service provider to obtain user location information prior to the user being registered with the network or the service provider and prior to a user request; and third program instructions to cache the user location information.

2. The system of claim 1, wherein the first, second, and third program instructions are at least one of maintained, deployed, created and supported by a service provider.

3. The system of claim 1, wherein the first, second, and third program instructions periodically update the user location information with liner grained location information and provide the updated user location information with finer grained location information for storage.

4. The system of claim 1, wherein the first, second, and third program instructions integrate into an IP Multimedia Subsystem (IMS) network.

5. The system of claim 1, wherein the first, second, and third program instructions integrate into a legacy network.

6. The system of claim 1, wherein the first and second program instructions are resident on a home location register and the user location information is stored on at least one of the home location register and the location platform.

7. The system of claim 1, further comprising fourth program instructions to receive a request by the user for location services and to provide the location services using the stored user location information.

8. The system of claim 1, wherein:

the first program instructions to register the user with the network or the service provider includes authenticating the user on a diameter server;

the second program instructions to trigger the location platform to obtain the user location information prior to the user request is requested by the diameter server; and the third program instructions to cache the user location information includes providing a notification to a location service provider.

9. The system of claim 1, wherein the user location information is obtained from one or more users that have opted into the location based service.

10. The system of claim 1, wherein the user location information is obtained from only one or more users that have opted into the location based service.

11. The system of claim 1, wherein the user location information is coarse grained location information.

12. The system of claim 11, wherein the coarse grained location information is location information that does not need precise coordinates.

13. The system of claim 1, further comprising program instructions to provide a high priority refresh of the cache to maintain a precise location of the location information of the user.

14. A method comprising:

receiving, by a computer processor, a network log on request or authentication;

requesting, by the computer processor, location information of a user upon receipt of the network log on request or authentication and prior to the user being logged on a network using the network log on request or authentication;

storing, by the computer processor, the location information in a cache;

receiving, by the computer processor, a request for location based services from the user; and retrieving, by the computer processor, the location information from the cache and using the location information to deliver composite services, of which the location information is a component.

15. The method of claim 14, wherein the steps of claim 14 are integrated into an IP Multimedia Subsystem (IMS) network which handle authorizations via the Diameter based signaling protocol.

16. The method of claim 14, wherein the steps of claim 14 are integrated into a legacy network.

17. The method of claim 14, wherein the requesting location information of a user is provided prior to a request by the user.

18. The method of claim 14, wherein the requesting location information of a user is periodically updated and refreshed in the cache.

19. A method comprising:

receiving, by a computer processor, a network log on request or authentication;

requesting, by the computer processor, location information of a user upon receipt of the network log on request or authentication;

storing, by the computer processor, the location information in a cache;

receiving, by the computer processor, a request for location based services from the user;

retrieving, by the computer processor, the location information from the cache and using the location information to deliver composite services, of which the location information is a component; and providing, by the computer processor, a low priority refresh of the cache to maintain a quality of the location information of the user.

* * * * *